(12) United States Patent
Peeper et al.

(10) Patent No.: US 7,619,630 B2
(45) Date of Patent: *Nov. 17, 2009

(54) PRESHADERS: OPTIMIZATION OF GPU PRO

(75) Inventors: Craig C. Peeper, Kirkland, WA (US); Daniel K. Baker, Seattle, WA (US); David F. Aronson, Woodinville, WA (US); Loren McQuade, Irvine, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/169,364

(22) Filed: Jul. 8, 2008

(65) Prior Publication Data
US 2008/0291207 A1  Nov. 27, 2008

Related U.S. Application Data

(63) Continuation of application No. 11/045,784, filed on Jan. 28, 2005, now Pat. No. 7,394,464.

(51) Int. Cl.
*G06F 15/16* (2006.01)
*G06F 15/00* (2006.01)
*G06T 1/00* (2006.01)

(52) U.S. Cl. ..................... 345/503; 345/501

(58) Field of Classification Search ................ 345/426, 345/501, 503

See application file for complete search history.

(56) References Cited

U.S. PATENT DOCUMENTS

2006/0152509 A1 * 7/2006 Heirich ................... 345/426

OTHER PUBLICATIONS

In the United States Patent and Trademark Office: Notice of Allowance and Fee(s) Due in re application U.S. Appl. No. 11/045,784, filed Jan. 28, 2005, 8 pages.

* cited by examiner

*Primary Examiner*—Kee M Tung
*Assistant Examiner*—Jacinta Crawford
(74) *Attorney, Agent, or Firm*—Woodcock Washburn LLP (57) ABSTRACT

A shader program capable of execution on a GPU is analyzed for constant expressions. These constant expressions are replaced with references to registers or memory addresses on the GPU. A preshader is created that comprises two executable files. The first executable file contains the shader program with the each constant expression removed and replaced with a unique reference accessible by the GPU. The first file is executable at the GPU. A second file contains the removed constant expressions along with instructions to place the values generated at the associated reference. The second executable file is executable at a CPU. When the preshader is executed, an instance of the first file is executed at the GPU for each vertex or pixel that is displayed. One instance of the second file is executed at the CPU. As the preshader is executed, the constant expressions in the second file are evaluated and the resulting intermediate values are passed to each instance of the first file on the GPU.

22 Claims, 5 Drawing Sheets

PRESHADERS: OPTIMIZATION OF GPU PRO

CROSS REFERENCE TO RELATED APPLICATIONS

This application is a continuation of application Ser. No. 11/045,784, filed Jan. 28, 2005, the contents of which are herein incorporated by reference in its entirety.

FIELD OF THE INVENTION

The present invention is directed to systems and methods for optimizing programmable shaders in connection with computer graphics. More particularly, the present invention is related to a computer-readable storage medium comprising computer-executable instructions for removing constant expressions from shaders executing at a graphics processing unit (GPU), and instead executing the constant expressions at a computer processing unit (CPU).

BACKGROUND OF THE INVENTION

Rendering and displaying three dimensional (3-D) graphics typically involves many calculations and computations. For example, to render a 3-D object, a set of coordinate points or vertices that define the object to be rendered is formed. Vertices can be joined to form polygons that define the surface of the object to be rendered and displayed. Once the vertices that define an object are formed, the vertices can be transformed from an object or model frame of reference to a world frame of reference and finally to two dimensional (2-D) coordinates that can be displayed on a flat display device, such as a monitor. Along the way, vertices may be rotated, scaled, eliminated or clipped because they fall outside of a viewable area, lit by various lighting schemes and sources, colorized, otherwise transformed, shaded and so forth. The processes involved in rendering and displaying a 3-D object can be computationally intensive and may involve a large number of vertices.

Complex 3-D objects, or portions thereof, can be represented by collections of triangles ("a mesh") representing the approximate geometry of the 3-D object, or by a geometry map, or surface, in 2-D surface space. The mesh can be specified through the position of the vertices of the triangles. One or more texture maps can be mapped to the surface to create a textured surface according to a texture mapping process. In this regard, signals textured over a surface can be very general, and can specify any sort of intermediate result that can be input to transformation mechanism(s), such as shader procedure(s), to produce a final color and/or other values associated with a point sample.

The computer graphics industry and graphics pipelines have seen a particularly tremendous amount of growth in the last few years. For example, current generations of computer games are moving to 3-D graphics in an ever increasing and more realistic fashion. At the same time, the speed of play is driven faster and faster. This combination has fueled a genuine need for the rapid rendering of 3-D graphics in relatively inexpensive systems.

The rendering of graphics data in a computer system is a collection of resource intensive processes. The process of shading, i.e., the process of performing complex algorithms upon set(s) of specialized graphics data structures, used to determine values for certain primitives, such as color, etc. associated with the graphics data structures, exemplifies such a computation intensive and complex process. Vertex shaders and pixel shaders are examples of such shaders.

Vertex and pixel shaders are computer programs that run on a specialized computer processor known as a graphics processing unit ("GPU"). The GPU is typically introduced into a general purpose computer system on a specialized piece of graphics hardware often with its own memory. An instance of a vertex or pixel shader is executed by the GPU, often in parallel, for every vertex or pixel in a specified 3-D mesh being displayed. Shaders are typically written in either the native assembly language of the particular GPU or in a high-level shader language, for example.

Shaders typically operate on stream data. The stream data comes from either a rasterization unit or a vertex stream unit on the GPU. In addition, shaders also receive input data from the host CPU known as constants. For a given execution of a set of meshes, these constants are unchanging. Shaders are typically authored with instructions which operate only on these constants, thereby causing each instance of the shader program executing on the GPU to generate intermediate values which are identical across all instances of the shader. The GPU's ability to run shaders is limited in comparison to a CPU by the amount of instructions and resources available. Given that an instance of a shader is executed for every vertex or pixel in a specified 3-D mesh being displayed, it is a waste of GPU resources for each instance of a shader to calculate the same identical intermediate values.

Therefore, what is needed are systems and methods for moving the evaluation of constant expressions in shader programs from the GPU to the CPU.

SUMMARY OF THE INVENTION

A shader program capable of execution on a GPU is analyzed for constant expressions. These constant expressions are replaced with references to registers or memory addresses on the GPU. A preshader is created that comprises two components. The first component (the GPU program) contains the shader program with each constant expression removed and replaced with a unique reference accessible by the GPU. The GPU program is executable at the GPU. A second component (the preshader program) contains the removed constant expressions along with instructions to place the values generated at the associated references. The preshader program is executable at a CPU. When the preshader is executed, an instance of the GPU program is executed at the GPU for each vertex or pixel that is displayed. One instance of the preshader program is executed at the CPU. As the preshader is executed, the constant expressions in the preshader program are evaluated and the resulting intermediate values are passed to each instance of the GPU program at the GPU.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
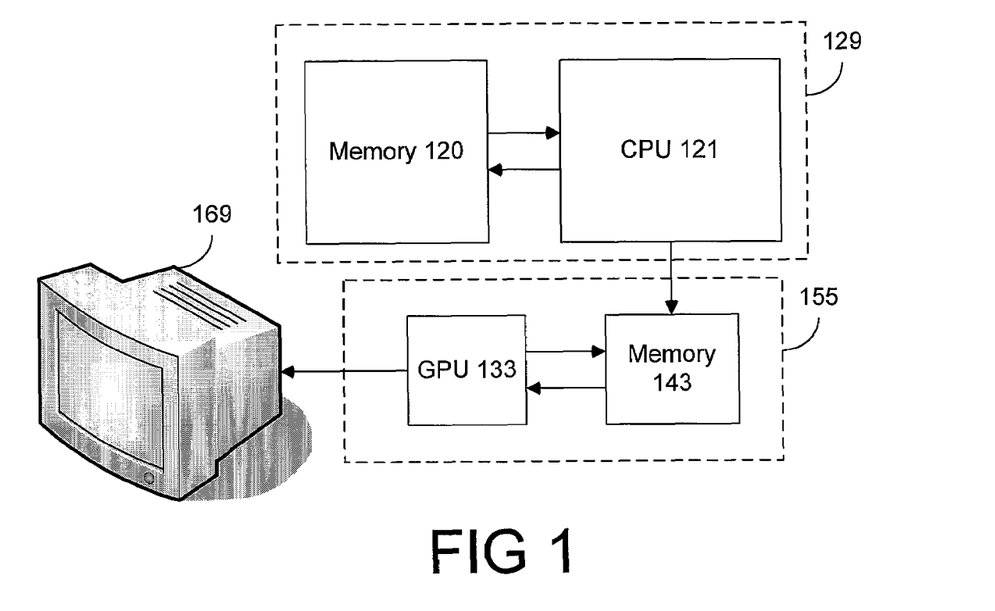
FIG. 1 is an exemplary preshader system in accordance with the present invention.

FIG. 1 is an exemplary preshader system in accordance with the present invention. The system comprises general purpose computer 129, graphics card 155, and display 169. The general purpose computer 129 comprises computer processing unit ("CPU") 121 and memory 120. The graphics card 155 comprises graphics processing unit ("GPU") 133 and memory 143. Graphics card 155 is capable of displaying three dimensional ("3-D") graphics on display 169. A 3-D shape is typically constructed out of several triangles, with each corner of a triangle known as a vertex. These 3-D shapes are commonly known as meshes. Before a given mesh can be displayed on display 169 it is desirably first converted into an array of colored dots, commonly known as pixels.

Graphics cards 155 are desirably able to modify or change the appearance of the meshes that are displayed on display 169. For example, a graphics card may be used to animate a mesh, light a mesh, or cast shadows. Programs that are commonly used to make these changes are known as shaders. Shaders typically operate on either the pixels making up the 3-D mesh before display, or directly on the vertices themselves. An instance of a shader is desirably executed for each vertex or pixel comprising the 3-D mesh. Shaders may operate on both the vertex and pixel data simultaneously. Shaders which operate on the vertex data typically modify the position of an object or mesh either through a transform or an animation, for example. Pixel shaders typically adjust the appearance of an object or mesh such as its color and the way in which the object is lit, for example.

The shaders are typically executed at the GPU 133 on stream data. The stream data desirably comprises data related to the 3-D mesh such as position of vertices, for example. The stream data may be read from the local GPU 133 memory, such as memory 143 for example. However, the stream data may also be read from CPU memory 120, for example.

Shaders may contain expressions which are constant, called constant expressions. Constant expressions are defined as those expressions that evaluate to the same set of intermediate values for all instances of a shader regardless of the pixel or vertex associated with that instance of the shader. Because each instance of a shader separately evaluates these constant expressions even though the evaluation will produce the same intermediate results, there is a large number of GPU cycles spent reevaluating the constant expressions.

Preshaders avoid this recalculation by moving the calculation of the constant expressions from the GPU 133 to the CPU 121. A specialized compiler, as described further with respect to FIG. 2, locates the constant expressions in the shader program. The shader program is desirably divided into a GPU program and a preshader program. The GPU program desirably comprises the shader program with the constant expressions removed. The constant expressions are desirably replaced with unique references to memory or register locations accessible to both the GPU 133 and the CPU 121, for example memory 143. The reference may be to any addressable location or register in either the graphics card 155, or the general purpose computer 129, provided that the locations are writable by the CPU 121 and readable by the GPU 133. The GPU program is desirably executable at the GPU 133, for example.

The preshader program desirably comprises the removed constant expressions. In addition, CPU 121 executable instructions are generated for each constant expression. The instructions provide that when the associated constant expression is evaluated the calculated intermediate results are desirably saved, or otherwise made available, at the memory location substituted for that constant expression in the GPU program. The preshader program is desirably executable on the CPU 121 through a GPU 133 emulator, for example. In addition, the preshader program may be directly executable on the CPU 121 through direct compilation of the preshader program into the native format of the CPU 121, for example. The preshader program may also be executable on the graphics card 155 independent of the execution of the GPU program at a specialized processor on the graphics card 155 (not shown).

When a preshader is selected for execution on a 3-D mesh being displayed on display 169, both the GPU program and the preshader program are desirably executed. An instance of the GPU program of the preshader is desirably executed at the GPU 133 for each pixel or vertex that comprises the displayed 3-D mesh. Because constant expressions evaluate to the same intermediate values for all instances of the GPU program, only one instance of the preshader program is desirably executed at the CPU 121, for example. As intermediate values are generated through the execution of the preshader program they are saved or made available to the GPU at the location specified in preshader program, for example memory 143. As each instance of the GPU program is executed at the GPU, the pre-calculated intermediate values are retrieved from memory or registers and incorporated into each execution of the GPU program.

Figure 2:
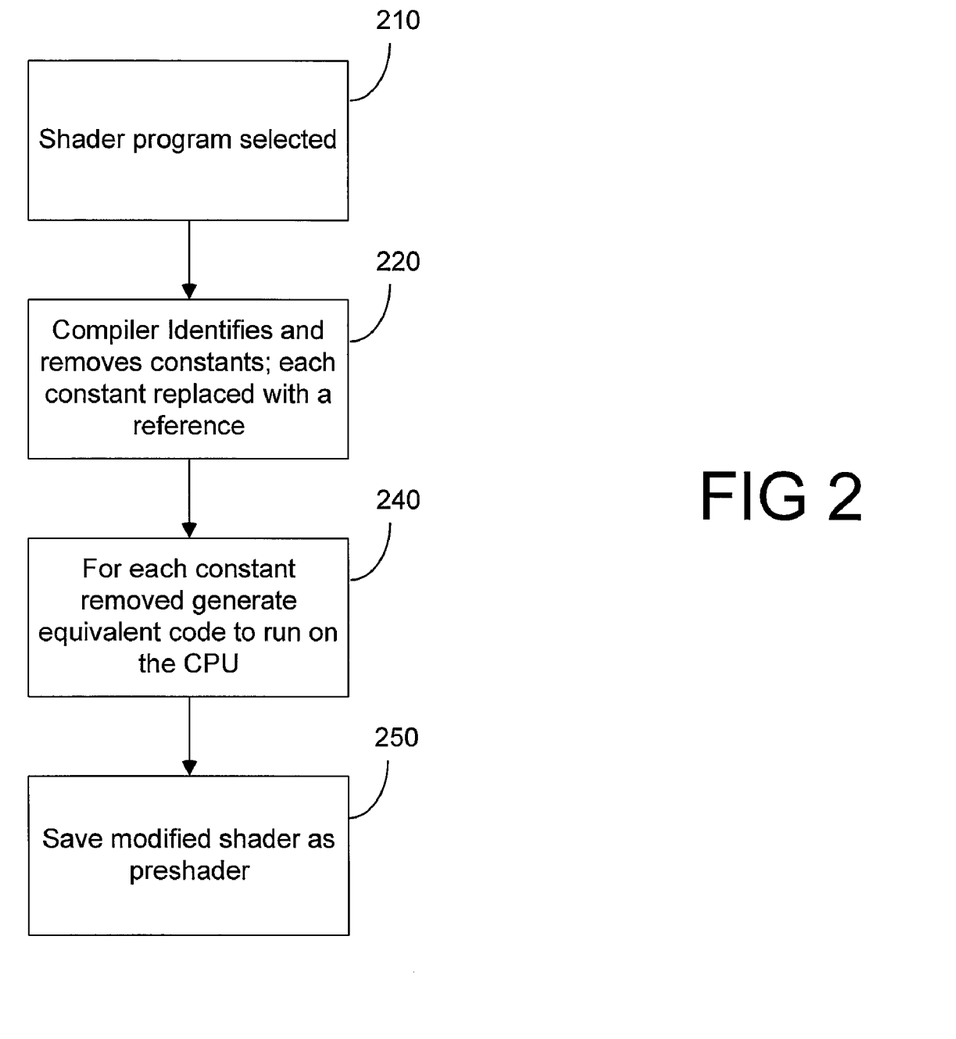
FIG. 2 is a flow diagram illustrating an exemplary method for generating a preshader from a shader in accordance with the present invention.

FIG. 2 is a flow diagram illustrating an exemplary method for generating a preshader from a shader in accordance with the present invention. A specialized compiler receives a shader program to convert into a preshader. The compiler analyses the program for constant expressions. For each constant expression located in the shader program, the constant expression may be removed and a unique reference is put in its place. The shader is divided into two programs: a GPU program comprising the original shader instructions with the constant expressions removed and replaced with references; and a preshader program comprising each of the removed constant expressions. The GPU program is desirably executable on a GPU, and the preshader program is directly executable on a CPU, or through an emulator or a virtual machine, for example. When the preshader is selected for execution both the GPU program and the preshader program are desirably executed. As the constant expressions in the preshader program are evaluated, the resulting intermediate results are placed in a location on the GPU corresponding to the reference associated with the constant expressions in the GPU program. Each instance of GPU program executing in the GPU desirably retrieves the intermediate values from the referenced location and incorporates them into the execution. Computing resources on the GPU are saved by evaluating each constant only once by the general purpose computer instead of multiple times by each instance of the shader on the GPU.

At 210, the shader program has been selected to be made into a preshader. As described with respect to FIG. 1, shaders are used in the display of 3-D meshes. An instance of a shader is executed for each pixel or vertex comprising the 3-D mesh. Each instance of the shader receives an element from the stream. Each element comprises certain properties of the 3-D mesh such as vertex coordinates, texture coordinates, and tangent directions, for example. This stream data resides in either GPU or CPU memory, and was desirably previously loaded by an application.

In each shader there may exist constant expressions. A constant expression has the property that no matter which element of a stream the shader is processing, the constant expression will evaluate to the same intermediate value. These constant expressions are based on input values which are known to not come from a stream element, or other changeable resource. Because streams can have many thousands of elements, it is desirable to move the evaluation the constant expressions from each of the instances of the shader to a general purpose CPU.

At 220, the shader is processed into a preshader by a compiler. The shader may be written in a programming language specific to the GPU or in a high level shader programming language, for example. A specialized compiler desirably parses the shader program looking for constant expressions. Constant expressions located in the shader program are desirably replaced by references. Each constant expression is desirably replaced by a unique reference that is accessible to the GPU. The reference may correspond to a register on the GPU, or to a portion of memory on the GPU, for example. The reference may also be located at the general purpose computer, as long as the location on the general purpose computer is readable by the GPU. Any system, method, or technique for assigning references may be used. The shader with the constant expressions removed is the GPU program of the preshader.

At 240, a preshader program is generated comprising each of the removed constant expressions. The new program desirably comprises the removed expressions in addition to new CPU executable instructions to deposit any calculated intermediate results at the associated reference indicated in the GPU program. The new file is desirably executable directly on the CPU, or through a GPU emulator or virtual machine on a general purpose computer, for example.

At 250, the GPU program and the preshader program are associated together such that when the preshader is selected for execution on a particular 3-D mesh, an instance of the GPU program is executed on the GPU for each vertex or pixel comprising the 3-D mesh, and a single instance of the preshader program is executed at the CPU. By executing each constant expression desirably only once at the CPU for all instances of the preshader, considerable GPU cycles are saved.

Figure 3:
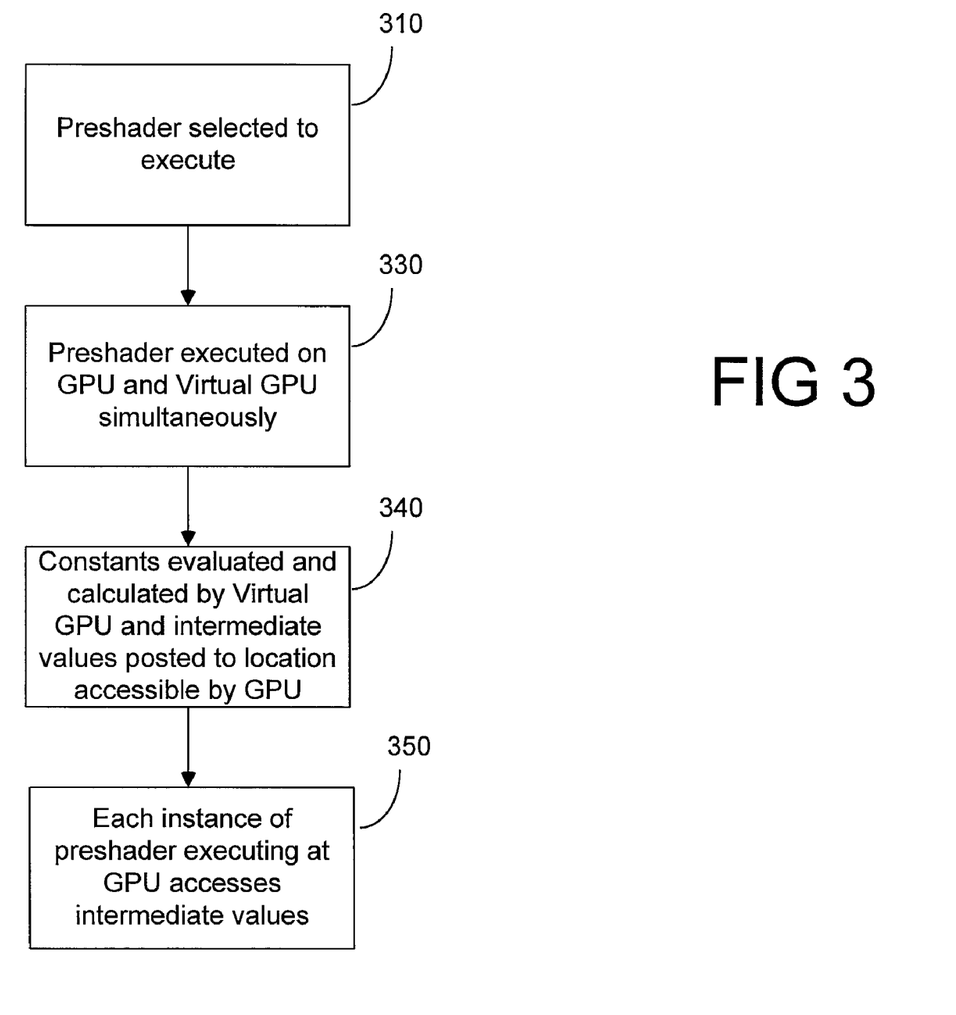
FIG. 3 is a flow diagram illustrating an exemplary method for executing a preshader in accordance with the present invention.

FIG. 3 is a flow diagram illustrating an exemplary method for executing a preshader in accordance with the present invention. A preshader is selected for execution. The preshader comprises two executable parts, a GPU program for execution on a GPU, and a preshader program for execution on a general purpose computer, for example. At least one instance of the GPU program is executed at the GPU, and one instance of the preshader program is executed on the virtual GPU. Constant expressions comprised in the preshader program are evaluated during the execution, and intermediate values are generated. These intermediate values are placed in a location accessible by the GPU. The GPU executing the GPU program of the preshader code retrieves the calculated intermediate values and these values are desirably incorporated into the execution of the GPU programs of the preshader code at the GPU.

At 310, a preshader is desirably selected for execution. As described previously with respect to FIG. 2, a preshader comprises two parts: a GPU program, which is desirably a shader program with the constant expressions replaced with references; and a preshader program comprising each of the removed constant expressions. The GPU program is desirably executable on a GPU. The preshader program is desirably directly executable on a CPU of a general purpose computer, or using a virtual machine or an emulator of the GPU, for example.

At 330, the GPU program and the preshader program desirably begin executing. Prior to execution, the GPU program is desirably loaded into the memory of the GPU, and the preshader program is desirably loaded into the memory of the CPU. Any system, method or technique known in the art for loading a program into memory can be used. The preshader program desirably begins executing at any time after the constant data becomes available, but desirably before the execution of the GPU program. Because the GPU program depends on the intermediate values generated by the preshader program, the intermediate values are desirably made available before the GPU program begins to execute.

As described with respect to FIG. 1, an instance of a shader is typically executed for each vertex or pixel comprising a 3-D mesh. Accordingly, an instance of the GPU program of the preshader is desirably executed in the GPU for each vertex or pixel in the displayed 3-D mesh. However, since constant expressions are unchanging for each instance of a shader, only one instance of the preshader program of the preshader is desirably executed at the CPU. Accordingly, the greater the number vertices or pixels, the greater the computational saving realized by moving the constant expressions from the GPU to the CPU.

At 340, the constants expressions comprised in the preshader program are evaluated and the results are desirably posted to the associated reference. As described with respect to FIG. 2, the constant expressions are those expression that do not depend on the changing stream data, and are therefore the same for each instance of the GPU program. Evaluation of the constant expressions desirably produces intermediate values that are desirably used by the instances of the GPU program executing at the GPU. Each intermediate value is desirably saved to the reference associated with its constant expression. The reference desirably corresponds to a portion of memory or register that is accessible by the GPU and the instances of the GPU program. The reference may be a pointer, for example. Any system, method or technique known in the art for referencing may be used.

At 350, each instance of the GPU program executing at the GPU desirably accesses the stored intermediate values. As each instance of the GPU program executing at the GPU processes the stream data, a reference is desirably encountered in the GPU program code. This reference desirably corresponds to one of the constant expressions that was removed from the shader. This constant expression was desirably evaluated at the CPU resulting in an intermediate value that was desirably saved to the location specified by the reference. Each instance of the GPU program executing at the GPU desirably retrieves the stored intermediate values and desirably continues to process the stream data using the retrieved intermediate values.

Figure 4:
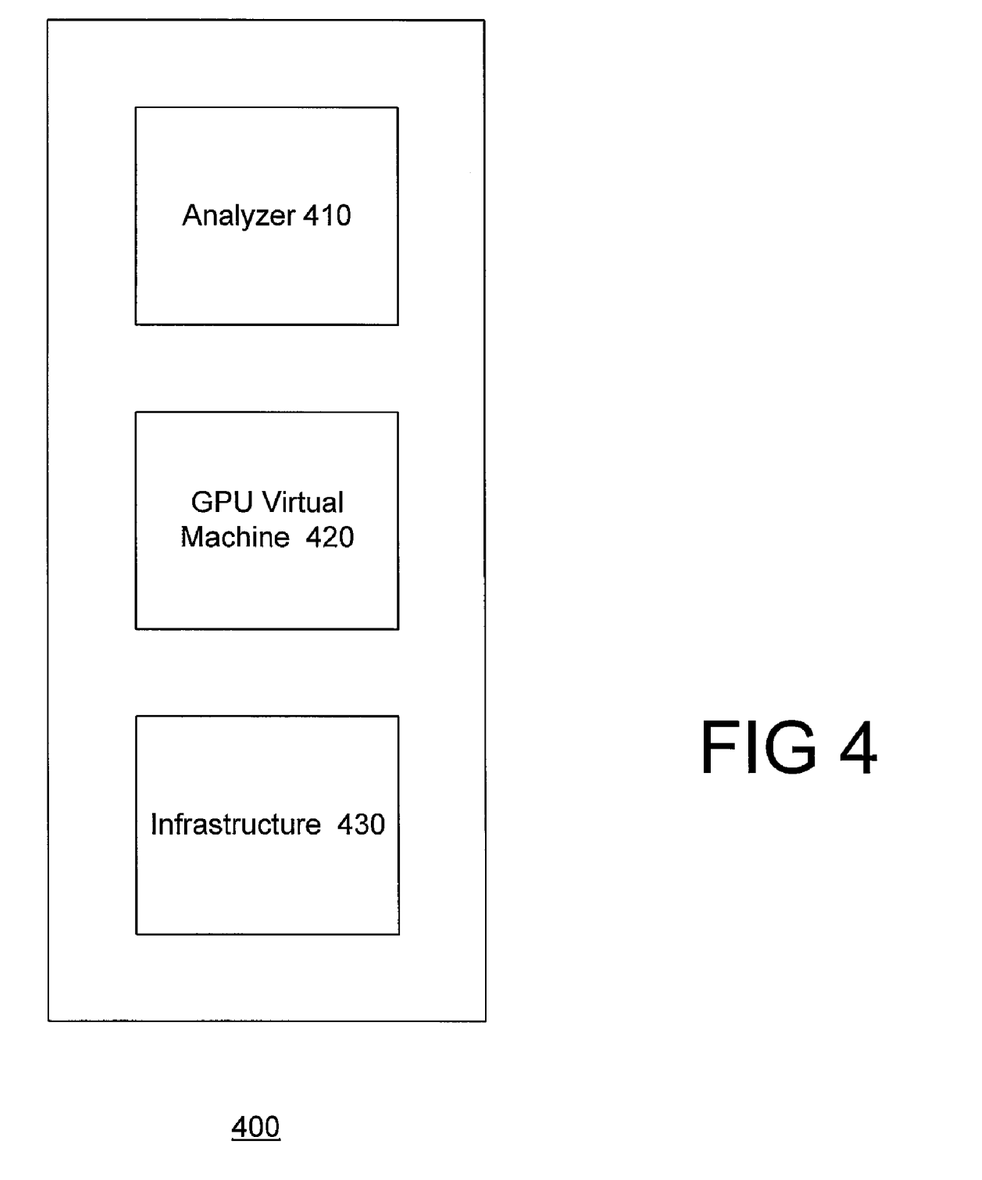
FIG. 4 is a block diagram illustrating components of an exemplary preshader system in accordance with the present invention.

FIG. 4 is a block diagram illustrating components of an exemplary preshader system 400 in accordance with the present invention. The system 400 comprises several means for performing functions. These means include analyzer 410, GPU virtual machine 420, and infrastructure means 430.

The analyzer 410 receives a shader program and generates a preshader program from the received shader program. The shader program is used to modify or affect the appearance of a 3-D mesh displayed by a GPU. An instance of the shader program is executed by the GPU for each vertex or pixel comprising the displayed 3-D mesh. The shader may comprise several constant expressions. The analyzer 410 desirably analyzes the shader program for constant expressions and replaces each constant expression with a reference to a unique memory address. The analyzer 410 desirably generates the preshader in two parts or programs. A first part comprises the original shader program with the constant expressions removed and replaced with memory references and is desirably executable on the GPU. The second part comprises the removed constant expressions and is executable by the GPU virtual machine 420, for example. However, the second part may also be made directly executable directly on the CPU. The analyzer 410 can be any implemented using any suitable system, method or technique known in the art for identifying and removing constant expressions. The analyzer 410 can be implemented using software, hardware, or a combination of both.

The GPU virtual machine 420 provides an execution environment for the second part of the preshader. By executing each constant expression only once at the GPU virtual machine 420 versus multiple times for each instance of the shader, considerable GPU cycles are saved for each instance of the preshader executing at the GPU. The GPU virtual machine 420 can be any implemented using any suitable system, method or technique known in the art for emulating GPU hardware on a general purpose CPU. The GPU virtual machine 420 can be implemented using software, hardware, or a combination of both.

The infrastructure 430 desirably connects each instance of the first part of the preshader executing at the GPU with the preshader program of the preshader executing at the GPU virtual machine 420, or directly on the CPU, for example. While the preshader technique moves the execution of constant expression from the GPU to the CPU, the instances of the preshader executing on the GPU still depend on the intermediate values generated by the GPU virtual machine 420, or generated directly by the CPU, for example. The infrastructure 430 desirably allows the instances of the preshader executing at the GPU to communicate with and receive intermediate values from the instance of the preshader executing at the CPU. The infrastructure 430 can be implemented using software, hardware, or a combination of both.

Exemplary Computing Environment

Figure 5:
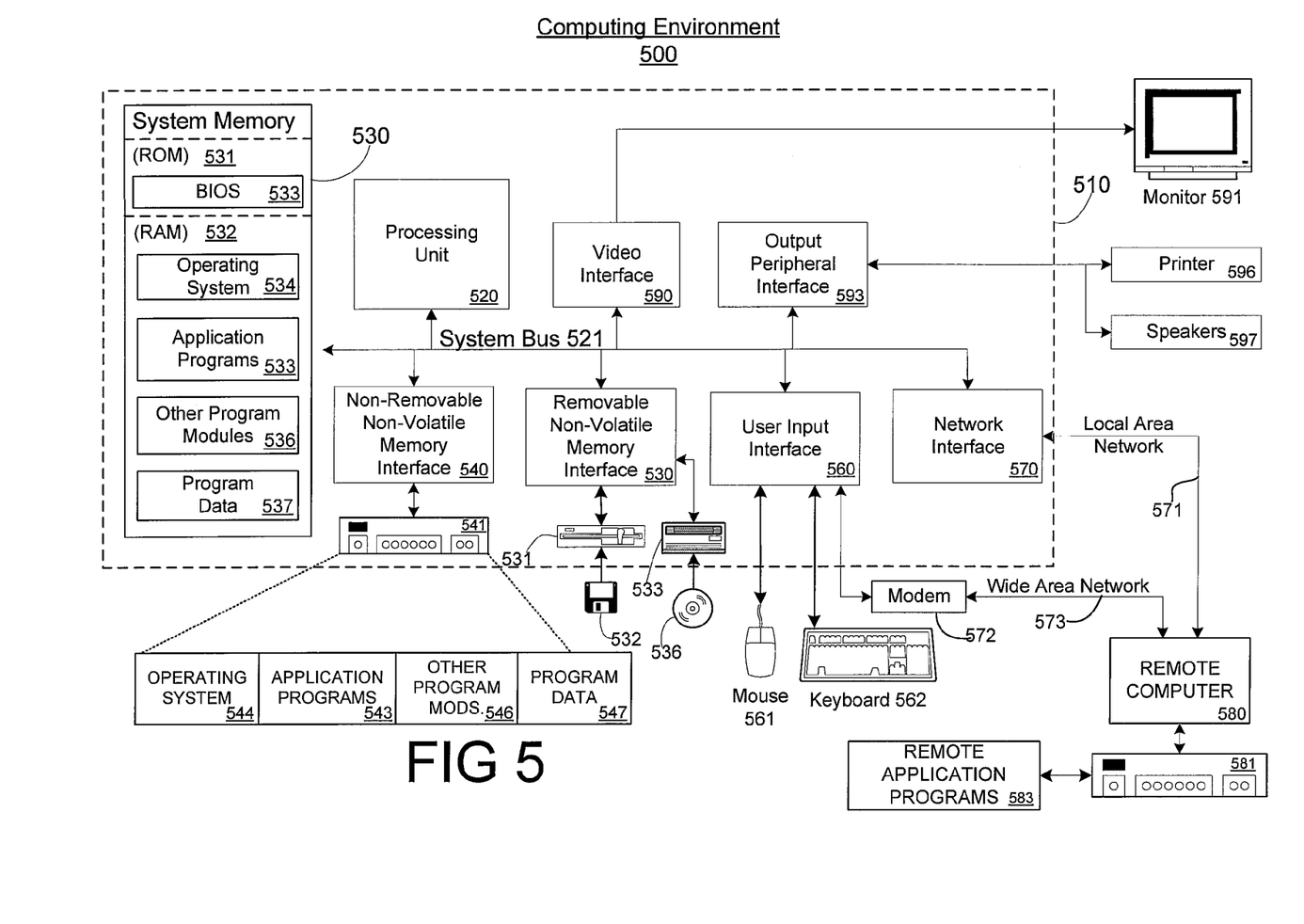
FIG. 5 is a block diagram showing an exemplary computing environment in which aspects of the invention may be implemented.

FIG. 5 illustrates an example of a suitable computing system environment 500 in which the invention may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing the invention includes a general purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 510 typically includes a variety of computer readable media. Computer readable media can be any available media that can be accessed by computer 510 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or non-volatile memory such as ROM 531 and RAM 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/non-volatile computer storage media. By way of example only, FIG. 5 illustrates a hard disk drive 540 that reads from or writes to non-removable, non-volatile magnetic media, a magnetic disk drive 551 that reads from or writes to a removable, non-volatile magnetic disk 552, and an optical disk drive 555 that reads from or writes to a removable, non-volatile optical disk 556, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted include a LAN 571 and a WAN 573, but may also include other networks. Such networking environments are commonplace in offices, enterprise-wide computer networks, intranets and the internet When used in a LAN networking environment, the computer 510 is connected to the LAN 571 through a network interface or adapter 570. When used in a WAN networking environment, the computer 510 typically includes a modem 572 or other means for establishing communications over the WAN 573, such as the internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 583 as residing on memory device 581. It will be appreciated that the network connections shown are exemplary and other means of establishing a communications link between the computers may be used.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A computer-readable storage medium comprising computer-executable instructions that when executed perform operations comprising:
    analyzing a shader program to find each constant expression that evaluates to a same set of intermediate values for all instances of the shader program;
    generating a first executable file corresponding to the shader program and to be executed in place of the shader program by replacing each found constant expression in the shader program with a unique reference; and generating a second executable file as a preshader program to be executed prior to execution of the first executable file, the second executable file comprising each replaced constant expression of the shader program, the second executable file as executed prior to the first executable file evaluating each replaced constant expression in such second executable file to produce an intermediate result and placing the intermediate result in a location corresponding to the unique reference associated with each found constant expression in the first executable file, each instance of the first executable file being executed in place of the shader program and after the execution of the second executable file, each instance of the first executable file upon encountering the unique reference therein retrieving the corresponding intermediate value as previously produced by the second executable file from the location corresponding to the unique reference and employing the retrieved intermediate value, wherein each replaced constant expression need only be evaluated once by the second executable file rather than multiple times by each instance of the first executable file.

2. The computer-readable storage medium of claim 1, wherein the computer-executable instructions are executable on a graphics processing unit (GPU).

3. The computer-readable storage medium of claim 2, wherein the first executable file is executable on the graphics processing unit (GPU).

4. The computer-readable storage medium of claim 2, wherein each unique reference comprises a reference to a register on the graphics processing unit (GPU).

5. The computer-readable storage medium of claim 2, wherein each unique reference comprises a memory address accessible by the graphics processing unit (GPU).

6. The computer-readable storage medium of claim 1, further comprising instructions for configuring each constant expression in the second executable file to pass intermediate values to the associated unique reference as specified in the first executable file when the second executable file is executed.

7. The computer-readable storage medium of claim 6, further comprising instructions for configuring the first executable file to retrieve the passed intermediate values from the associated unique references when the first executable file is executed.

8. The computer-readable storage medium of claim 1, wherein the first executable file is executed on a graphics processing unit (GPU) and the second executable file is executed on a computer processing unit (CPU).

9. A computing device, comprising:
one or more processing units; and
a computer-readable storage medium coupled to the one or more processing units, the computer-readable storage medium comprising computer-executable instructions that when executed by the one or more processing units perform operations comprising:
analyzing a shader program to find each constant expression that evaluates to a same set of intermediate values for all instances of the shader program;
generating a first executable file corresponding to the shader program and to be executed in place of the shader program by replacing each found constant expression in the shader program with a unique reference; and
generating a second executable file as a preshader program to be executed prior to execution of the first executable file, the second executable file comprising each replaced constant expression of the shader program, the second executable file as executed prior to the first executable file evaluating each replaced constant expression in such second executable file to produce an intermediate result and placing the intermediate result in a location corresponding to the unique reference associated with each found constant expression in the first executable file, each instance of the first executable file being executed in place of the shader program and after the execution of the second executable file, each instance of the first executable file upon encountering the unique reference therein retrieving the corresponding intermediate value as previously produced by the second executable file from the location corresponding to the unique reference and employing the retrieved intermediate value, wherein each replaced constant expression need only be evaluated once by the second executable file rather than multiple times by each instance of the first executable file.

10. The computing device of claim 9, wherein the computer-executable instructions are executable on a graphics processing unit (GPU).

11. The computing device of claim 10, wherein the first executable file is executable on the graphics processing unit (GPU).

12. The computing device of claim 11, wherein each unique reference comprises a reference to a register on the graphics processing unit (GPU).

13. The computing device of claim 11, wherein each unique reference comprises a memory address accessible by the graphics processing unit (GPU).

14. The computing device of claim 9, further comprising instructions for configuring each constant expression in the second executable file to pass intermediate values to the associated unique reference as specified in the first executable file when the second executable file is executed.

15. The computing device of claim 14, further comprising instructions for configuring the first executable file to retrieve the passed intermediate values from the associated unique references when the first executable file is executed.

16. The computing device of claim 9, wherein the first executable file is executed on a graphics processing unit (GPU) and the second executable file is executed on a computer processing unit (CPU).

17. A computing device, comprising:
a computer-readable storage medium comprising a first portion and a second portion of computer-executable instructions;
a first processing unit coupled to the computer-readable storage medium, the first processing unit to execute the first portion, the first portion generated by finding each constant expression in a shader program that evaluates to a same set of intermediate values for all instances of the shader program and replacing each found constant expression in the shader program with a unique reference; and
a second processing unit coupled to the computer-readable storage medium, the second processing unit to execute the second portion, the second portion generated by including therein each replaced constant expression of the shader program, the second portion to execute prior to execution of the first portion and as executing evaluating each replaced constant expression in such second portion to produce an intermediate result and placing the intermediate result in a location corresponding to the unique reference associated with each found constant expression in the first portion, each instance of the first portion being executed in place of the shader program and after the execution of the second portion, each instance of the first portion upon encountering the unique reference therein retrieving the corresponding intermediate value as previously produced by the second portion from the location corresponding to the unique reference and employing the retrieved intermediate value, wherein each replaced constant expression need only be evaluated once by the second portion rather than multiple times by each instance of the first portion.

18. The computing device of claim 17, wherein the second processing unit is further adapted to emulate the first processing unit and execute at least one replaced constant expression comprised in the second portion of the shader program.

19. The computing device of claim 17, wherein the second processing unit computer is further adapted to generate intermediate values as a result of the execution of each of the replaced constant expressions; and to provide the generated intermediate values to a location accessible to the first processing unit.

20. The computing device of claim 19, wherein the first processing unit is further adapted to retrieve the generated intermediate values at the location accessible to the first processing unit and to execute the first portion of the shader program with the generated intermediate values.

21. The computing device of claim 19, wherein the location accessible to the first processing unit comprises a register on the first processing unit.

22. The computing device of claim 19, wherein the location accessible to the first processing unit comprises memory on the first processing unit.

* * * * *